United States Patent Office 2,940,982
Patented June 14, 1960

2,940,982
EPOXY BETA-LACTONES

William J. Sullivan, Oakland, Calif., assignor to Shell Oil Company, a corporation of Delaware No Drawing. Filed Apr. 14, 1958, Ser. No. 728,077

5 Claims. (Cl. 260—343.9)

This invention relates to novel epoxy lactones and to a process for their preparation. More particularly, the invention relates to new and useful epoxy beta-lactones and to a process for preparing them from epoxyaldehydes and ketenes.

Lactones generally are useful organic compounds for a variety of purposes. They are employed as ingredients of perfumes and are, since they are known to have physiological activity, useful in pharmaceuticals. Such beta-lactones as beta-propiolactone are, because they are highly reactive substances, worthwhile as intermediates for a wide variety of syntheses. They may also be copolymerized with polyhydroxy compounds to give useful resinous substances.

It is well known that ketenes and carbonyl compounds can be reacted together to form beta-lactones. In general, these reactions must be conducted in the presence of catalysts in order to proceed. Indeed, so unstable are most ketenes, such as the aldoketenes, that they dimerize rapidly under ordinary reaction conditions. It is for this reason that catalysts are ordinarily employed to promote the ketene-carbonylic compound reaction. For example, in U.S. Patent 2,356,459, issued August 22, 1944, to F. E. Kung, the reaction between ketenes and carbonylic compounds to form beta-lactones is conducted with the aid of a Friedel-Crafts catalyst, such as boron trifluoride. Caldwell, in U.S. Patent 2,450,116, issued September 28, 1948, prepares beta-lactones from similar reactants employing metal perchlorate catalysts, and in U.S. Patent 2,466,420, issued April 5, 1949, Hagenmeyer discloses the use of metal salts of aliphatic monocarboxylic acid catalysts.

Surprisingly, I have discovered that a new class of beta-lactones, epoxy beta-lactones, may be prepared from ketenes and epoxy carbonylic compounds without the use of catalysts and under conditions wherein the epoxy ring of the carbonylic reactant is preserved intact in the beta-lactone product.

It is an object of my invention to provide a new class of beta-lactones. A further object of my invention is the provision of beta-lactones containing, in addition to the lactone ring, an epoxy ring. A still further object of my invention is the provision of a process for preparing epoxy lactones from epoxyaldehydes. Still another object of my invention is the process whereby epoxyaldehydes may be reacted with ketenes to form epoxy beta-lactones without the use of a catalyst and under conditions such that the epoxy ring is preserved intact. Other objects will be apparent from the following description of the invention.

My invention comprises a novel class of beta-lactones, epoxy beta-lactones. These lactones are characterized by possession both of the vicinal epoxy, or oxirane, ring

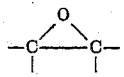

as well as the beta-lactone ring

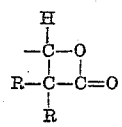

where R is selected from the class of monovalent radicals consisting of the hydrogen atom and hydrocarbyl radicals. These new and useful compounds are prepared, in my invention, by reacting together an epoxy-aldehyde and a ketene.

The new epoxy beta-lactones are best described by reference to the method by which they are prepared, and thus by consideration of the reactants employed to form them, that is, by a discussion of the nature of the epoxy-aldehydes and ketenes used.

Epoxyaldehydes are those compounds containing both the formyl, —CHO, group and the epoxy ring

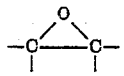

In general, they are prepared by the epoxidation of the olefinic bonds of unsaturated aldehydes. Suitable aldehydes, for example, 2-methyl-2,3-epoxypropionaldehyde, are prepared by epoxidation of alpha-methacrolein, 2,3-epoxy butyraldehyde from crotonaldehyde, 2,3-epoxy-2-methyl butyraldehyde from tiglic aldehyde, beta-phenyl-2,3-epoxy propionaldehyde from cinnamaldehyde, and so forth. While the most reactive class, and therefore the preferred class, of epoxyaldehydes are those 2,3-epoxyaldehydes prepared from alpha, beta-unsaturated aldehydes, other types of epoxyaldehydes having one or more epoxy groups are included within the scope of such reactants. Examples include the epoxy compounds prepared by epoxidation of the olefinic linkages of such aldehydes as 3-butene-1-al, citral, citronellal, rhodinal, 1-formyl-3-cyclohexene, and the like.

Of all the epoxyaldehydes, the most preferred is glycidaldehye, the expoxy compound prepared by epoxidation of acrolein. Since glycidaldehyde includes a terminal 2,3-epoxy group, it is a very active reactant and produces as well valuable epoxy beta-lactones.

The ketenes which are employed in the process of my invention can be represented by the formula

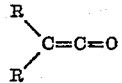

wherein the R's represent the same or different monovalent radicals selected from the group consisting of the hydrogen atom and hydrocarbyl compounds. Of these, the parent compound, ketene, $CH_2=C=O$, is preferred as the ketene in my process, but also within the scope of the invention are its alkyl and aryl homologs.

Examples of operative ketenes include the aldoketenes such as methyl ketene, ethyl ketene, propyl ketene, butyl ketene, phenyl ketene, benzyl ketene, and naphthyl ketene; and the ketoketenes such as dimethyl ketene, diethyl ketene, dipropyl ketene, methyl ethyl ketene, diphenyl ketene, propyl phenyl ketene, dibenzyl ketene, and so forth.

The reaction between the epoxyaldehydes and the ketenes may be carried out within a wide range of reactant proportions. In view of the tendency of ketenes to polymerize, however, the use of a large excess of the ketene reactant over the aldehyde is not recommended. The epoxyaldehyde reactant, however, is very stable under the reaction conditions of our process and therefore the use of greater than equimolar amounts of epoxyaldehyde is not harmful. The preferred reactant ratio for most economical conduct of my process is that in which from substantially equimolar amounts of epoxyaldehyde and ketene reactant to 2 moles of the aldehyde per mole of ketene are employed, since no particular advantage is obtained by large excesses of either reactant.

In accordance with my invention, the reaction between epoxyaldehydes and the ketenes to form epoxy beta-lactones is conducted at temperatures such that the reaction goes smoothly without either undue polymerization of the ketene or the lactone product, and without attack on the epoxy ring. The temperature range for these conditions to obtain is that between about −40° C. and about +30° C., while the preferred range, for reasons of reaction speed and convenience, is that from about −10° C. to about +10° C.

The reaction is not dependent on the physical state of the reactants, and therefore may be conducted in the presence or absence of an inert solvent. Suitable solvents include benzene, toluene, xylene, the paraffins that are liquids at the reaction temperatures, dioxane, diethyl ether, and the like. In this way, solid, viscous or volatile reactants may conveniently be dissolved in the solvent for ease in handling and reacting.

As has been pointed out, the reaction between the epoxyaldehyde and ketene will proceed to produce epoxy beta-lactones without the aid of catalysts. The reactants are, in themselves, sufficiently active under the reaction conditions to cause the beta-lactone formation to go smoothly. Furthermore, the use of catalysts, such as boron trifluoride, tends to bring about the predominant production of undesired by-products as well as polymers of the lactone. I have found, however, that by using weak to moderately active Lewis acids as catalysts higher conversions of the epoxyaldehyde can be obtained. Thus, in some circumstances the use of such of these catalysts as zinc chloride, zinc acetate, zinc nitrate, boric acid, or mixed aluminum-silicon-zirconium oxides, may be desirable.

The process of my reaction may be carried out in a continuous, semi-continuous or batchwise manner by methods already extensively described in the lactone literature. At the close of my reaction, it is convenient to separate the reactants from the product by such a well-known method as vacuum distillation. Thus, the ketene and aldehyde reactants, having a lower molecular weight than the epoxy beta-lactone product, may be readily flashed from the reaction mixture, and the residual lactone may then be recovered and purified by solvent or distillation methods.

The product epoxy beta-lactones thus prepared are light-colored mobile liquids. Their structure is, of course, determined by the nature of the epoxyaldehyde and ketene reactants. Exemplary lactones are shown in the following table together with the reactants from which they are prepared.

| Aldehyde | Ketene | Lactone |
|---|---|---|
| glycidaldehyde | ketene | 4,5-epoxy-beta-pentalactone. |
| 2-methyl-2,3-epoxy propionaldehyde. | do | 4,5-epoxy-4-methyl-beta-pentalactone. |
| glycidaldehyde | methyl ketene | 4,5-epoxy-2-methyl-beta-pentalactone. |
| beta-phenyl-2,3-epoxy propionaldehyde. | diethyl ketene | 5-phenyl-2,3-epoxy-2,2-diethyl-beta-pentalactone. |
| 3,4-epoxy-pentanal | propyl ketene | 5,6-epoxy-2-propyl-beta-heptalactone. |
| 2,6-dimethyl-2,3-epoxy octanal. | ketene | 8,9-epoxy-5,9-dimethyl-beta-decalactone. |
| 3,4-epoxy cyclohexanal | do | 3,4-epoxycyclohexyl-beta-propiolactone. |

It can be seen that the monoepoxy-beta-lactones are characterized by the formula

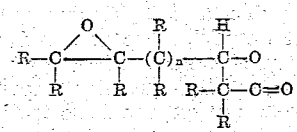

wherein the R's are the same or different monovalent radicals selected from the class consisting of the hydrogen atom and hydrocarbyl radicals, and $n$ is at least zero. Preferably, such hydrocarbyl radicals are drawn from alkyl radicals such as methyl, ethyl, propyl, butyl, pentyl, decyl, and the like, particularly those having fewer than about five carbon atoms, and from aromatic monovalent radicals, including phenyl and such alkyl-substituted phenyl radicals as benzyl, tolyl, xylyl, and the like. Polyepoxy beta-lactones, such as are prepared from diepoxy aldehydes, are also included within the scope of my invention.

By virtue of their possession of the epoxy group and the versatile beta-lactone configuration, the epoxy beta-lactones of my invention are useful for a variety of reactions. Both types of oxygen-containing rings may be employed in polymerization reactions. For example, such alkali metal salts as potassium carbonate may be used to produce solid polyepoxide polyester acids which can be hydrolyzed to monomeric beta-hydroxy epoxy acids. The lactones may also be copolymerized through their lactone and epoxy rings with such other compounds as epoxy ethers and polyhydroxy compounds. The epoxy copolymers of the first type are useful, by virtue of their hardness and flexibility, as surface coatings.

The copolymers of the second type, produced by copolymerization of my epoxy beta-lactones with such compounds as ethylene glycol, propylene glycol, hexanediol-1,4, pentaerythritol, and the like, are film-forming materials which are compatible with cellulose ethers, cellulose esters, polyvinyl halides and the like and give additional stability, flexibility and toughness to these materials. Compounds of this type are analogous to those described in U.S. Patent 2,455,731, issued December 7, 1948 to J. R. Caldwell.

The following examples will illustrate the nature and properties of the novel epoxy beta-lactones of this invention, as well as the process by which they are prepared. It should be understood, however, that the examples are merely illustrative and are not to be regarded as limitations to the appended claims, since the basic teachings therein may be varied as will be understood by one skilled in the art. In the examples, the ingredients are expressed in parts by weight unless otherwise indicated.

*Example I*

A ketene generator, comprising an electric grid arranged in refluxing acetone, was set up to deliver ketene at a known rate. With this generator, 0.328 mole of ketene was bubbled into 0.50 mole of glycidaldehyde in 200 ml. of diethyl ether at 0° C. The reaction mixture was allowed to stand for several hours, and the ether was then removed under reduced pressure. The unreacted ketene and glycidaldehyde were then flashed off, and the product epoxy beta-lactone distilled at 84°–86° C. at about 3 mm. of mercury. This product had a refractive index at 20° C. of 1.4530.

A 70% yield was thus obtained. Upon analysis, the following data were obtained:

| Percent | C | H | Epoxide Value, eq./100 g. | Ester Value, eq./100 g. | Acidity Value, eq./100 g. |
|---|---|---|---|---|---|
| Calculated for $C_5H_6O_3$ | 52.6 | 5.26 | 0.877 | 0.88 | |
| Found | 52.3 | 5.4 | 0.846 | 0.88 | 0.009 |

Another sample of the 4,5-epoxy-beta-pentalactone prepared from ketene and glycidaldehyde was reacted with 100 parts of ethanol and 0.1 g. of p-toluenesulfonic acid, and the resulting mixture was heated at 100° C. for 3 hours. The unreacted ethanol was removed under reduced pressure and the residue neutralized with dilute alkali, extracted with ether and dried over anhydrous magnesium sulfate. The product boiling at 90°–95° C.

at less than 1 mm. was collected, and the resulting ester analyzed to yield the following data:

| Percent | C | H | Ester Value, eq./100 g. |
|---|---|---|---|
| Calculated for $C_9H_{18}O_3$ | 53.6 | 8.8 | 0.48 |
| Found | 52.5 | 8.75 | 0.42 |

These data correspond to an ether-ester produced by alcoholysis of a compound having the structure

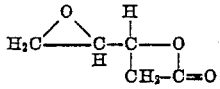

Example II

When ketene, produced as in the previous example, is passed into a 200 ml. dioxane solution containing 0.25 mole of 2,3-epoxy-beta-phenyl propionaldehyde under the conditions noted, a similar amount of 4,5-epoxy-5-phenyl-beta-pentalactone is obtained.

Example III

When diphenyl ketene is substituted for the ketene in Example I, a compound having the formula

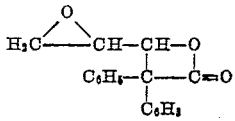

is obtained.

Example IV

By using 2,3-epoxy butyraldehyde in Example I in place of glycidaldehyde, 4,5-epoxy-beta-hexalactone is obtained.

Example V

By using the reaction conditions of Example I and combining 100 ml. ether solutions containing, respectively, 0.25 mole of methyl ketene and 0.31 mole of 3,4-epoxy-pentanal, 5,6-epoxy-2-methyl-beta-heptalactone is prepared.

I claim as my invention:

1. The epoxy beta-lactone having the formula

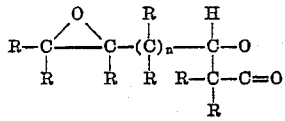

where R is selected from the class of monovalent radicals consisting of the hydrogen atom and alkyl radicals having up to 10 carbon atoms, and mononuclear hydrocarbon aryl and hydrocarbon aralkyl radicals having up to 8 carbon atoms and $n$ is an integer from 0 to 4.

2. As a novel class of compounds, epoxy beta-lactones having the formula

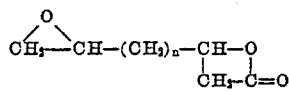

where $n$ is an integer from 0 to 4.

3. 4,5-epoxy-beta-pentalactone.
4. 4,5-epoxy-beta-hexalactone.
5. 4,5-epoxy-2,2'-diphenyl-beta-pentalactone.

References Cited in the file of this patent

UNITED STATES PATENTS 2,786,068   Frostick et al. _____ Mar. 19, 1957

FOREIGN PATENTS 500,661   Canada _____ Mar. 16, 1954